(12) United States Patent
Kato et al.

(10) Patent No.: US 7,360,869 B2
(45) Date of Patent: Apr. 22, 2008

(54) IMAGE PROCESSING AND INK-JET RECORDING APPARATUS FOR CARRYING OUT PROCESSING FOR REDUCING AMOUNT OF INK DELIVERED FROM RECORDING APPARATUS TO RECORDING MEDIUM

(75) Inventors: Minako Kato, Kawasaki (JP); Makoto Torigoe, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 11/235,216

(22) Filed: Sep. 26, 2005

(65) Prior Publication Data

US 2006/0066671 A1   Mar. 30, 2006

(30) Foreign Application Priority Data

Sep. 27, 2004  (JP) .............................. 2004-280027

(51) Int. Cl.
*B41J 2/21*  (2006.01)
(52) U.S. Cl. ........................... 347/43; 347/15; 358/519
(58) Field of Classification Search ................ 347/15, 347/41, 43; 358/519, 3.02
See application file for complete search history.

(56) References Cited

U.S. PATENT DOCUMENTS 5,633,663 A * 5/1997 Matsubara et al. .......... 347/41
5,661,508 A     8/1997 Sugimoto et al.
6,130,685 A * 10/2000 Matsubara et al. .......... 347/41
6,893,114 B2 * 5/2005 Yano et al. ................. 347/43

FOREIGN PATENT DOCUMENTS

JP   2000-355158 A   12/2000

* cited by examiner

*Primary Examiner*—Thinh Nguyen
(74) *Attorney, Agent, or Firm*—Canon U.S.A. Inc., IP Division (57) ABSTRACT

When image data output to an ink-jet recording apparatus for performing color recording using inks of a plurality of colors is to be processed, input image data is converted into data corresponding to colors of inks and gamma correction is applied to the data corresponding to colors of inks. In this gamma correction processing, the grayscale value represented by the data is decreased to reduce the amount of shot-in ink. In the present invention, gamma correction for data corresponding to a chromatic ink differs from gamma correction for data corresponding to an achromatic ink such that higher gray level data is decreased by a smaller factor than lower gray level data for the data corresponding to the achromatic ink.

15 Claims, 6 Drawing Sheets

IMAGE PROCESSING AND INK-JET RECORDING APPARATUS FOR CARRYING OUT PROCESSING FOR REDUCING AMOUNT OF INK DELIVERED FROM RECORDING APPARATUS TO RECORDING MEDIUM

BACKGROUND OF THE INVENTION

1. Field of the Invention

The present invention relates to image processing apparatuses, image processing methods, and printer drivers. More particularly, the present invention relates to an image processing apparatus and an image processing method for carrying out processing for converting input image data into data for inks of a plurality of colors. Furthermore, the present invention relates to a printer driver and a recording apparatus for executing the above-described image processing method.

2. Description of the Related Art

A color ink-jet printer, as one example of color output apparatuses, is widely used due to its advantage that it supports various types of output media including paper and film. Many color printers use recording agents (inks) of three colors: cyan (C), magenta (M), and yellow (Y) or four colors: C, M, Y, and black (K) for image formation. In a typical printer, image data to be recorded is converted into data for recording agent that realizes the colors supported in the printer according to predetermined color processing parameters before it is recorded.

In ink-jet recording apparatuses, which use water-based ink, recording media such as paper often fail to absorb water completely, leading to problems such as mixture of different inks, paper cockling that cause interference between the recording apparatus and the recording element. To avoid such problems, the amount of ink delivered per unit area is restricted in accordance with the recording medium and the recording method employed. Hereinafter, this amount of ink is referred to as "the amount of shot-in ink".

The amount of shot-in ink is affected by two factors: one is related to the recording medium itself and depends on the type of recording medium and the thickness of the ink-absorbing layer, and the other depends on the recording speed and method. In general, as the recording speed increases, the absorbed amount of ink decreases. Furthermore, the amount of shot-in ink should be restricted in recording modes in which paper cockling should be suppressed to a lower level by the method from paper feeding to paper ejection. In recording modes for recording on both sides of one sheet of paper, a recording method for decreasing the density over the entire area may be employed in order to prevent low visibility of images due to ink bleeding through the paper. Furthermore, the amount of shot-in ink is also decreased in recording modes intended to reduce the amount of ink for the purpose of reducing the running cost. As described above, the desired amount of shot-in ink differs depending on the recording medium, the recording method, and the purpose.

One technique for realizing recording media and recording methods that support different amounts of shot-in ink is to decrease the amount of shot-in ink by thinning recording with respect to a recording mode in which the amount of shot-in ink is large. For this thinning recording, the colors may be uniformly thinned or the amount of thinning may differ for each color.

A known method performs control such that the amount of shot-in black ink differs from those of shot-in color inks depending on the recording medium and the recording mode, thus preventing problems appearing on recorded images.

U.S. Pat. No. 5,661,508 (Patent Publication No. 02952077) discloses a recording apparatus for ejecting a plurality of inks while moving a plurality of recording heads relative to the recording medium for recording. Furthermore, there is disclosed a method that, when a thinned image is to be recorded on this recording apparatus, changes the amount of ink to be delivered to the recording medium for each color by causing the thinning rates corresponding to respective recording heads to differ from one another.

Japanese Patent Laid-Open No. 2000-355158 describes a structure in which the amount of ink to be delivered to the recording medium is different depending on the ink color. More specifically, the maximum amount of shot-in black ink onto the recording medium is controlled to become smaller than those of shot-in color inks.

It is not only for ink-jet recording apparatuses that the amount of delivered color material is restricted as described above. For example, the amount of color material is also controlled with electrophotographic methods and thermal transfer methods that use resin-based toner in order to maintain the glossiness and image fastness. In addition, it is known that the running cost can be reduced by restricting the amount of color material to be delivered. Therefore, a reduction in the amount of color material to be used is also conceivable to reduce the running cost.

However, since the known technique uniformly thins the amounts of shot-in inks regardless of the gray level, although superior gradation performance is maintained, excessive thinning is carried out even in areas with a sufficient margin for the amount of shot-in ink to decrease the density. In particular, high density is preferred for black because thick characters are highly recognizable and superior gradation performance and contrast are maintained. For this reason, excessive thinning is not desired for black.

SUMMARY OF THE INVENTION

The present invention has been conceived in light of these circumstances, and is intended to restrict the amounts of shot-in inks so as to heavily record a color whose high density is preferred, such as black, while still maintaining superior gradation performance.

According to one aspect of the present invention, an image processing apparatus processes image data output to an ink-jet recording apparatus for performing color recording using inks of a plurality of colors. The image processing apparatus causes thinning processing for image data corresponding to a chromatic ink from among the plurality of inks to differ from thinning processing for image data corresponding to an achromatic ink from among the plurality of inks to generate image data corresponding to the plurality of inks.

According to another aspect of the present invention, an image processing method processes image data output to an ink-jet recording apparatus for performing color recording using inks of a plurality of colors. In this image processing method, thinning processing for image data corresponding to a chromatic ink from among the plurality of inks differs from thinning processing for image data corresponding to an achromatic ink from among the plurality of inks to generate image data corresponding to the plurality of inks.

In other words, according to the present invention, when image data output to the ink-jet recording apparatus for performing color recording using inks of a plurality of colors is to be processed, thinning processing for image data corresponding to the chromatic ink from among the plurality of inks differs from thinning processing for image data corresponding to the achromatic ink from among the plurality of inks to generate image data corresponding to the plurality of inks.

More specifically, input image data is converted into data corresponding to colors of the inks, gamma correction is applied to the data corresponding to colors of the inks, and the data subjected to gamma correction is converted into binary data for each ink. In this gamma correction, the output data is thinned at a predetermined rate at all gray levels for the data corresponding to the chromatic ink, whereas the output data is thinned at a lower rate at higher gray levels than at lower gray levels for the data corresponding to the achromatic ink.

With the above-described structure, for example, when processing for decreasing the amount of shot-in ink depending on the recording mode and recording medium is to be carried out, the contrast and black visibility can be enhanced to produce high-quality recorded images while superior gradation performance is maintained. According to the present invention, a decrease in image quality, which occurs when data for all color inks is thinned simply at the same rate, can be prevented.

High gray level data for the achromatic ink may be thinned at a rate lower than the predetermined rate.

The thinning rate may be set such that the maximum amount of shot-in ink per unit area is equal to or smaller than a set value.

The chromatic color includes cyan, magenta, and yellow, and the achromatic color includes black.

The execution of thinning may be controlled depending on the recording mode of the ink-jet recording apparatus or the recording medium to be used.

Still another aspect of the present invention is realized by a printer driver executed by a computer device that can be connected to an ink-jet recording apparatus using inks of plurality of colors. In other words, the printer driver executes the image processing method when it operates in the computer device to output image data to the recording apparatus via an interface. With this printer driver, the above-described function can be achieved. In addition, the function of the present invention can also be achieved with a storage medium storing the printer driver.

According to the present invention, preferable quality of recorded images with high black density can be achieved without increasing the maximum amount of shot-in ink while still maintaining the gradation performance. In particular, the present invention allows images with higher black density and gradation performance to be recorded when the amount of shot-in ink is decreased depending on the recording mode and recording medium than when data for all ink is thinned simply at the same rate.

Further features of the present invention will become apparent from the following description of exemplary embodiments with reference to the attached drawings.

DESCRIPTION OF THE EMBODIMENTS

Preferred embodiments according to the present invention will now be described in detail with reference to the attached drawings. The components described in the embodiments below should be considered as illustrative only, and are not intended to limit the scope of the present invention.

In this specification, the term "record" (also referred to as "print") means to form not only significant information, such as characters and graphics, but images and patterns, whether significant or insignificant, on a recording medium. In this specification, the term "record" also means to process a medium, whether or not the processing result appears recognizable to the human visual sense.

Furthermore, "recording media" include not only paper used in general recording apparatuses but also ink-absorbable members such as cloth, plastic film, metal plate, glass, ceramic, wood, and leather.

The term "ink" (also referred to as "liquid") should be taken in such a broad sense, as in the definition of the above-described term "record (print)", that it includes a liquid used to form images, patterns, and so on or to process a recording medium when it is delivered onto the recording medium.

First Embodiment

A first embodiment will now be described by way of example of an ink-jet printer for recording using inks of four colors: C (cyan), M (magenta), Y (yellow), and K (black). To describe image processing for generating output data for each ink, processing in a mode for restricting the amount of shot-in ink is discussed.

Figure 1:
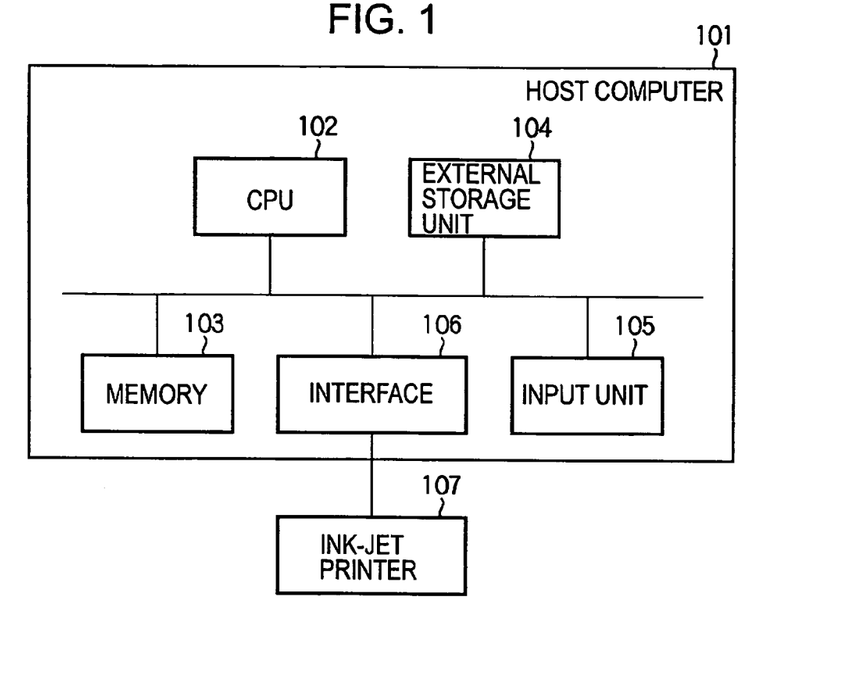
FIG. 1 is a block diagram depicting a schematic structure of an image processing system to which the present invention is applied.

FIG. 1 is a block diagram depicting a schematic structure of an image processing system to which the present invention is applied. Referring to FIG. 1, a host computer 101 includes a CPU 102, a memory 103 including a ROM and a RAM, an external storage unit 104 such as a hard disk (HD), an input unit 105 such as a keyboard and a mouse, and an interface 106 with a connected printer. The CPU 102 executes a printer driver loaded into the memory 103 to realize image processing such as color-conversion processing and quantization processing to be described later. This program may be stored in the external storage unit 104 or may be supplied from an external apparatus not shown in the figure.

An ink-jet printer 107 for carrying out color recording using four color inks of CMYK is connected to the host computer 101 through the interface 106. The host computer 101 transmits data subjected to image processing and control information to the ink-jet printer 107 for recording. The ink-jet printer 107 may employ any ink-ejecting method and ink-recording method, whether serial or full lines, as long as the ink-jet printer uses four color inks of CMYK.

Figure 2:
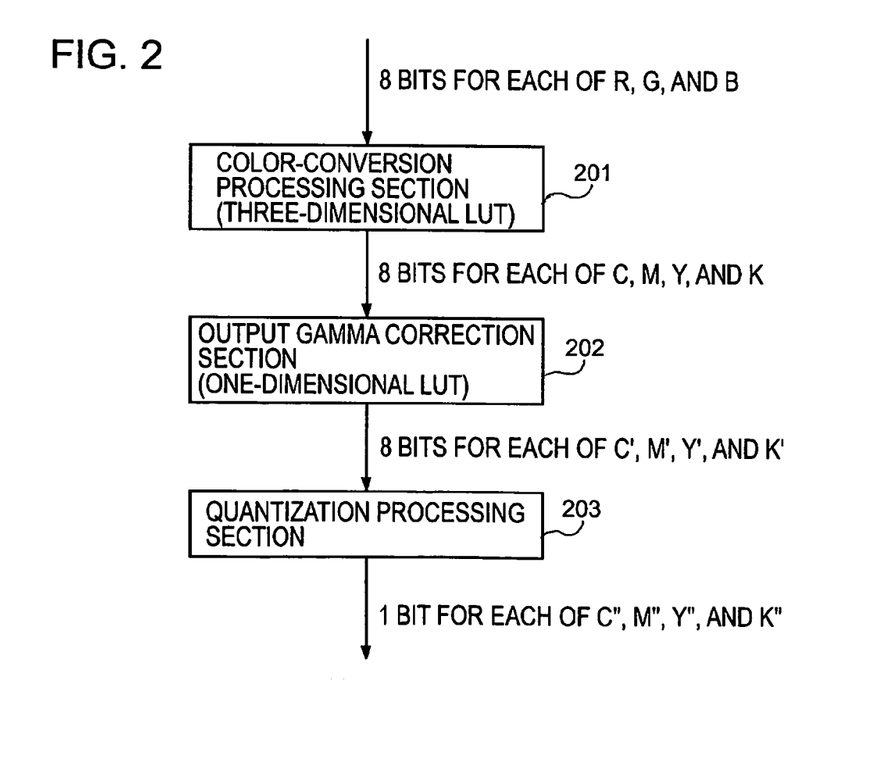
FIG. 2 is a flowchart for image processing by the image processing system shown in FIG. 1.

FIG. 2 is a block diagram depicting image processing carried out according to this embodiment, and shows a flow of image processing for converting image data represented in input 8 bits for each RGB color component (256 gray levels) into data of 1 bit for each CMYK color component and outputting the resultant data.

The input 8-bit data for each RGB color component is first converted into 8-bit data for each CMYK color component for the ink colors used in the printer by a three-dimensional lookup table (LUT) in a color-conversion processing section 201. This processing converts from the input RGB colors into the output CMYK colors. Input image data is often represented in three primary colors (RGB) based on an additive mixture used in illuminators such as display units. The conversion processing is carried out for ink-jet printers because inks of four colors, i.e., CMY based on a subtractive mixture and K, are used in ink-jet printers.

The three-dimensional LUT used in the color-conversion processing section 201 stores data discretely. Values between the stored data are calculated through interpolation processing, which is known to those skilled in the art and thus will not be described in detail.

The 8-bit data for each CMYK color component subjected to color-conversion processing is then subjected to output gamma correction by a one-dimensional LUT in an output gamma correction section 202 for conversion into 8-bit data for each C'M'Y'K' color component. The relationship between the numbers of recording dots per unit areas and output characteristics (e.g., reflection density) does not exhibit a linear relationship in many cases. Therefore, output gamma correction is applied to ensure a linear relationship between CMYK 8-bit input levels and output characteristics in response to the input levels.

As a result of the above-described color-conversion processing and output gamma correction, the input 8-bit data for each RGB color component is converted into 8-bit data for each of color components corresponding to the CMYK inks used in the ink-jet printer.

The ink-jet printer according to this embodiment is an apparatus for carrying out binary recording, i.e., recording represented in two states: with or without ink. Thus, 8-bit data for each CMYK color component is quantized into binary data for each color component by the quantization processing section 203. Known quantization methods include the error diffusion method and the dither method.

Figure 3A:
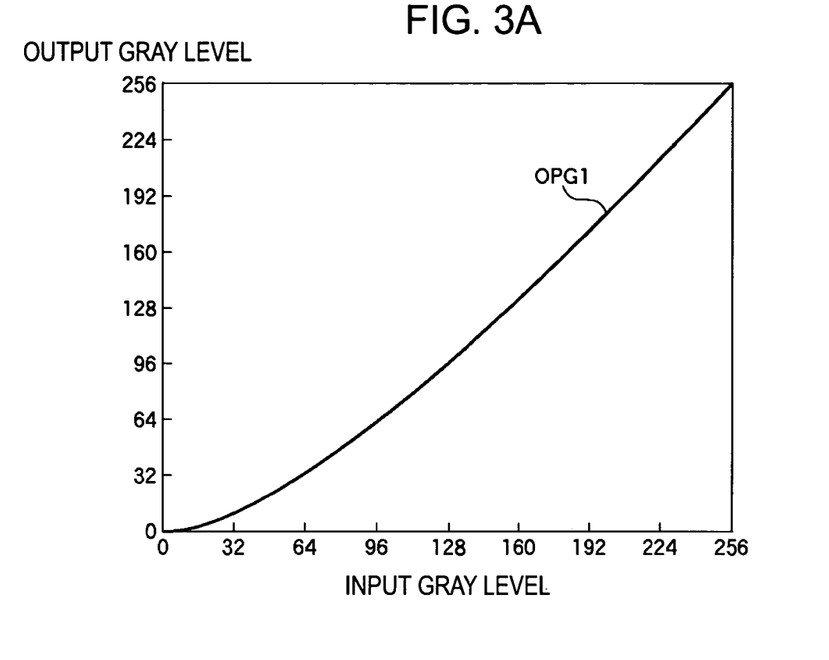
FIGS. 3A, 3B, and 3C are graphs depicting a characteristic of an output gamma correction table in normal mode, ink assignment in a gradation from white to black, and the amount of shot-in ink in a gradation from white to black, according to a first embodiment.

FIG. 3A is a graph depicting a characteristic OPG1 of the output gamma correction table, where a restriction upon the amount of shot-in ink according to this embodiment is not applied (hereinafter, also referred to as "normal mode"). The horizontal axis and the vertical axis represent input gray levels (C, M, Y, K) and output gray levels (C', M', Y', K'), respectively. The higher the output gray levels, the larger the number of recording dots, namely, the denser the recorded information. In this embodiment, the same table is used for all CMYK colors for simplicity.

Figure 3B:
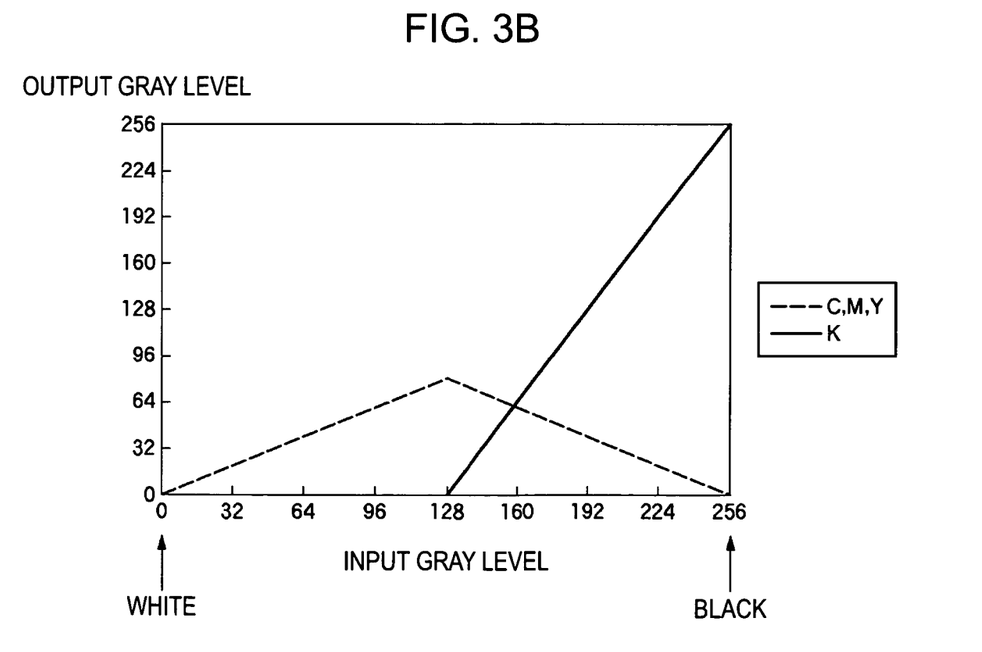

FIG. 3B is a graph depicting assignment of CMYK inks in a gradation from white to black, and corresponds to the three-dimensional LUT giving parameters for processing carried out by the color-conversion processing section 201 shown in FIG. 2. Here, the same values are used for CMY for simplicity. The left end of the graph indicates "white" with a grayscale value of 0, corresponding to an input signal of R=G=B=255. The right end of the graph indicates "black" with a grayscale value of 255, corresponding to an input signal of R=G=B=0. The area between "white" and "black" is shades of gray, which corresponds to input signals from R=G=B=1 to 254.

Figure 3C:
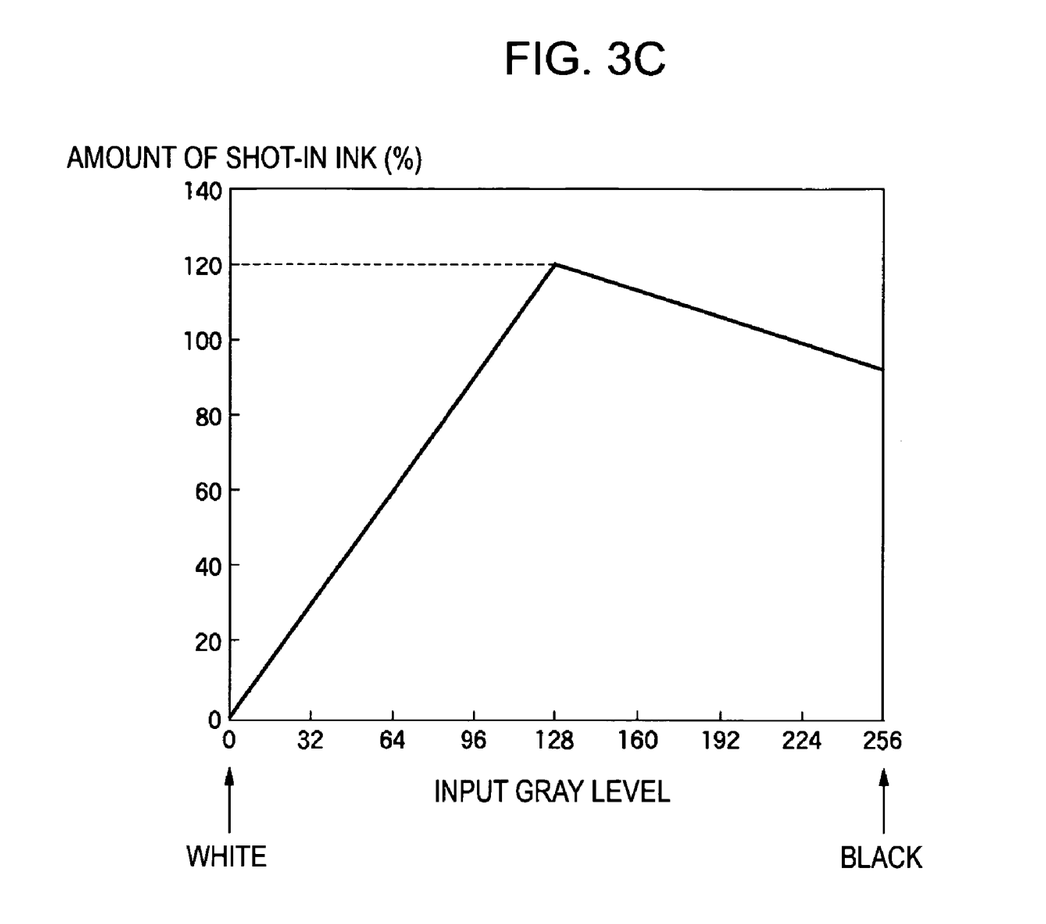

FIG. 3C is a graph illustrating the amount of shot-in ink at each gray level shown in FIG. 3B. The amount of shot-in ink is the amount of ink calculated from the number of dots, and is specified by the amount of ink per unit area. This embodiment assumes that the amount of ink equivalent to four dots in an area of 1/600 inches square corresponds to 100%.

As is apparent from FIG. 3B, low gray levels with grayscale values of less than 128, i.e., light gray close to white, are expressed by a color mixture of CMY inks (process black) in order to reduce a granular impression, and as the gray becomes denser, the number of recording dots increases. In this case, as shown in FIG. 3C, as the gray becomes denser, the amount of shot-in ink increases. Dense gray is produced only with CMY inks before a point at which sufficient darkness to prevent black ink dots from being recognizable is attained. Then, when this level of darkness is attained, the black ink is applied to express gray with four CMYK colors. As the grayscale value further increases (it becomes darker), the amount of the black ink is increased and the amounts of CMY inks are decreased. For this reason, as shown in FIG. 3C, the amount of shot-in ink exhibits the maximum at the intermediate density, and is decreased in the vicinity of black where the amount of black ink increases. As is apparent from FIG. 3C, the maximum amount of shot-in ink in normal mode is 120% at the substantially center gray level.

In general color processing where CMY color mixture ink and black ink are used, the amount of delivered ink reaches the maximum for colors with intermediate lightness. This is because CMY dots are replaced with K dots at higher grayscale values, which results in a decrease in the amount of delivered ink, whereas CMY dots are used in noticeable high-lightness areas where dots are sparsely recorded to suppress a granular impression.

Figure 4A:
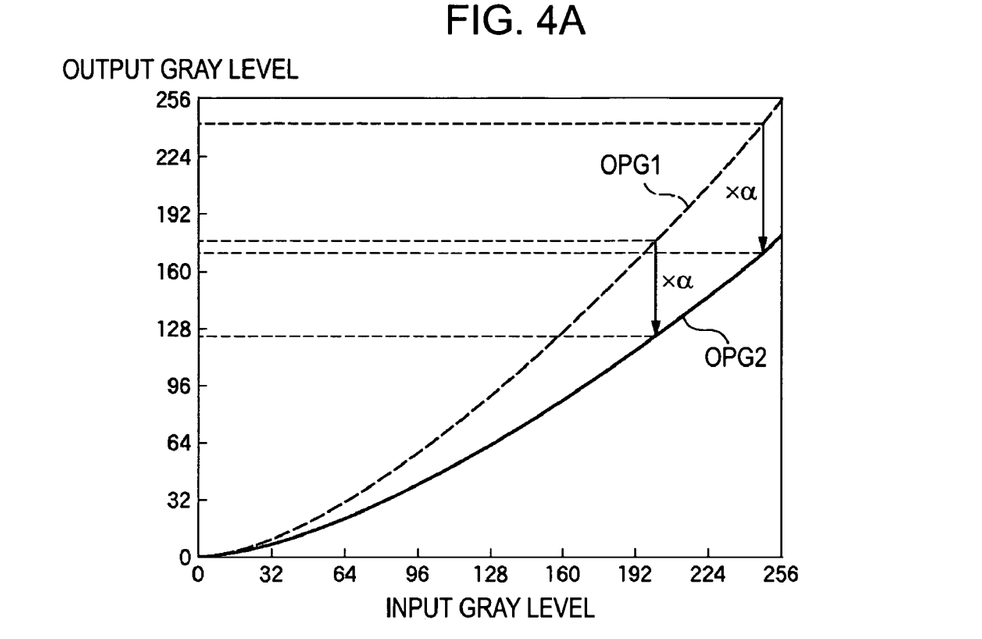
FIGS. 4A and 4B are graphs depicting a characteristic of an output gamma correction table in thinning mode and the amount of shot-in ink in a gradation from white to black, according to the first embodiment.
Figure 4B:
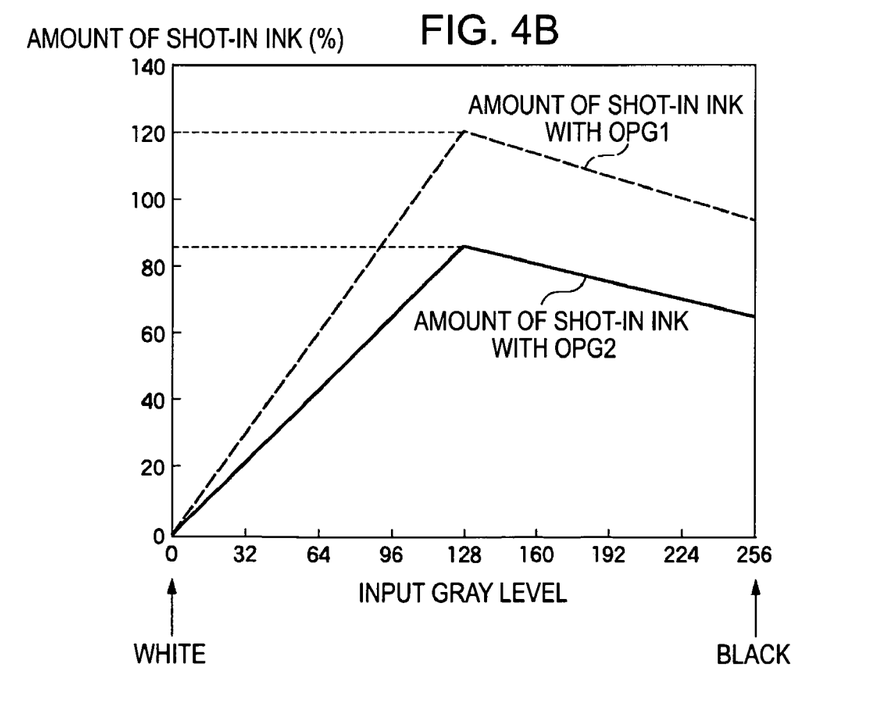

FIG. 4A is a graph depicting a characteristic OPG2 of the output gamma correction table in a mode where the amount of shot-in ink is restricted (hereinafter, also referred to as "thinning mode"). FIG. 4B is a graph depicting the amount of shot-in ink in a gradation from white to black when the amount of shot-in ink is restricted. Recording modes corresponding to the thinning mode include a high-speed recording mode where the recording speed is high, a draft recording mode where test recording (trial printing) is performed, and a recording mode where ink is prevented from bleeding through the paper for double-sided recording.

In FIG. 4A, as in FIG. 3A, the horizontal axis and the vertical axis represent input gray levels (C, M, Y, K) and output gray levels (C', M', Y', K'), respectively, where the higher the output gray levels, the larger the number of recording dots, namely, the heavier the recorded information. As with FIG. 3C, FIG. 4B shows the amount of shot-in ink at each gray level in a gradation from white to black. The operating procedure in thinning mode has been described with reference to FIG. 3B.

As shown in FIG. 4A, the characteristic OPG2 of the output gamma correction table in thinning mode is set so as to multiply the output gray level value at each input gray level value by constant α (<1), as compared with the characteristic OPG1 in normal mode. The value of α is determined according to a desired amount of shot-in ink. More specifically, if the desired amount of shot-in ink is smaller than the amount of shot-in ink in normal mode, α becomes smaller to increase the amount of thinning. In this embodiment, as shown in FIG. 4B, the maximum amount of shot-in ink in thinning mode is specified as 85%, whereas the maximum amount of shot-in ink in normal mode is 120%. For this reason, the characteristic OPG2 shown in FIG. 4A is adjusted by changing α such that the maximum amount of shot-in ink does not exceed 85%. At this time, the value of α is the same at all input gray levels, and the output values with OPG2 are α times the output values with OPG1 at all input gray levels.

As described above, the characteristic of the output gamma correction table is changed from OPG1 in normal mode to OPG2 in thinning mode. With this structure, the amount of shot-in ink in thinning mode can be reduced without changing the three-dimensional LUT, which supplies parameters, as shown in FIG. 3B, for processing carried out in the color-conversion processing section 201.

However, with this characteristic OPG2, the amount of delivered black ink is too small to cause high density although black has a sufficient margin for the amount of shot-in ink.

In light of this point, according to this embodiment, the output gamma correction table with the characteristic OPG2 is used for CMY inks, whereas the output values (amounts of shot-in ink) are increased in high gray-level areas only for K ink, as described below.

Figure 5A:
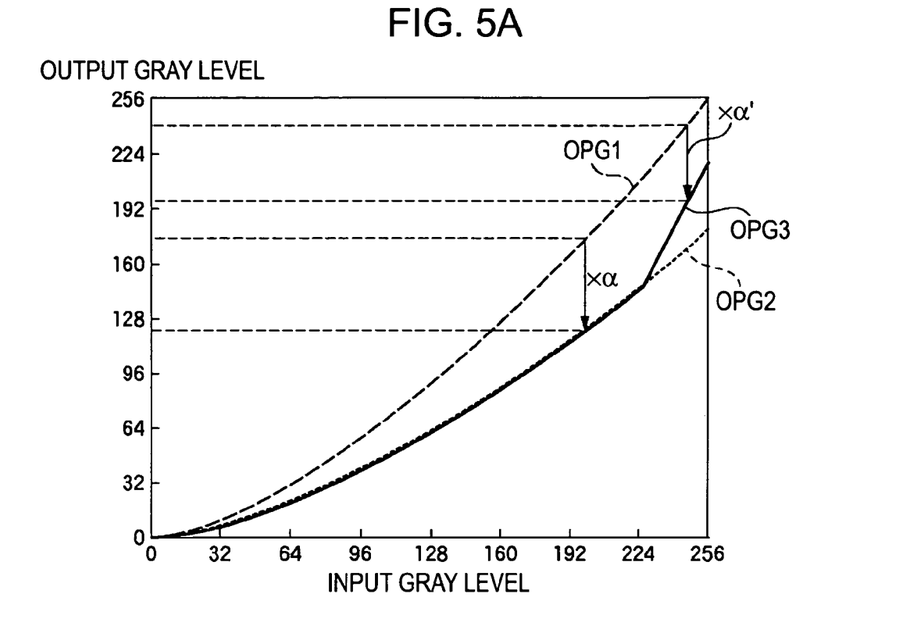
FIGS. 5A and 5B are graphs depicting a characteristic of an output gamma correction table where output values of black ink in thinning mode are corrected at high gray levels only and the amount of shot-in ink where output values of black ink are corrected at high gray levels only, according to the first embodiment.

FIG. 5A is a graph depicting a characteristic OPG3 of the output gamma correction table, where output values are increased in high gray-level areas only, as compared with OPG2. The values for OPG3 are α times the values for OPG1 at low gray levels, and α' times the OPG1 at high gray levels. In this case, α' is larger than α. More specifically, the amount of thinning (the proportion in which the amount of shot-in ink is restricted) is smaller in high gray-level areas than in low gray-level areas. Here, α' may differ for each input grayscale value. For example, α' should be set to attain smoothly continued output values as expressed by a linear function of input gray level values.

By the use of the output gamma correction table with the characteristic OPG3 shown in FIG. 5A, output values of K dots in black are increased compared with a case where the output gamma correction table with the characteristic OPG2 is used. With this structure, since a larger number of K dots are delivered, higher density is attained to achieve high visibility, high gradation performance, and high contrast.

Figure 5B:
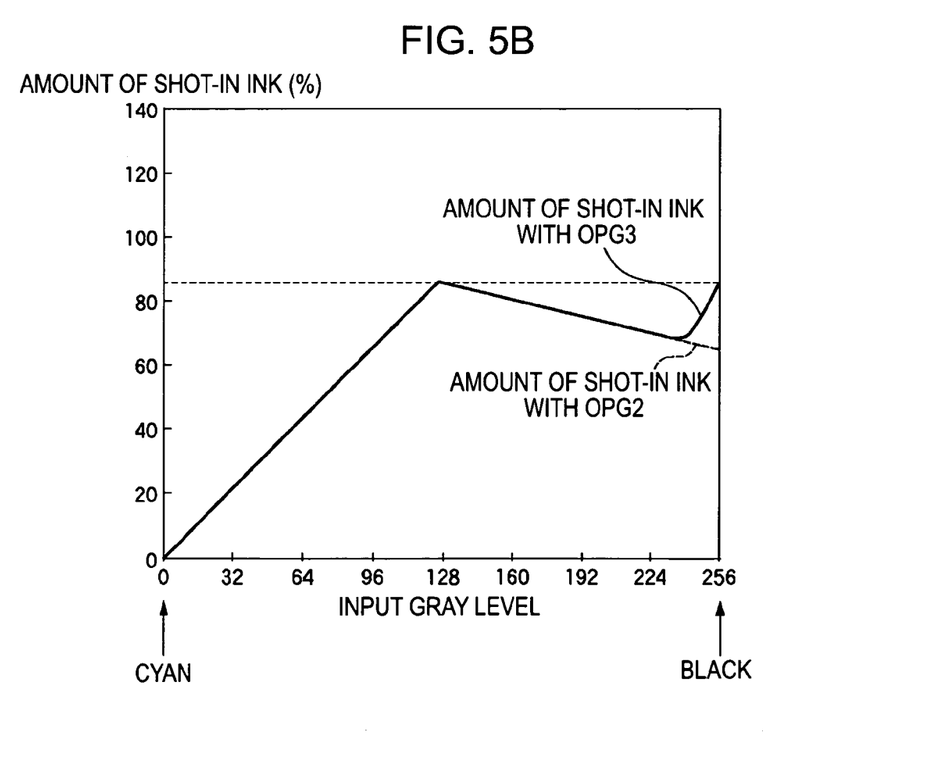

FIG. 5B is a graph depicting the amount of shot-in ink with the characteristic OPG3 in comparison with a graph of the amount of shot-in ink with the characteristic OPG2. As shown in this figure, since the amount of delivered ink is increased only in the high gray-level side near black having a sufficient margin for the amount of shot-in ink, the maximum amount of shot-in ink is 85% as with the characteristic OPG2.

As described above, according to this embodiment, the output gamma correction table for CMY inks used in thinning mode is an output gamma correction table with a characteristic OPG that gives a constant thinning rate at every input gray level. In addition, the output gamma correction table used for K ink is an output gamma correction table with the characteristic OPG3, which gives different thinning rates between the high gray-level side and the low gray-level side. With this structure according to the present invention, recorded images with sufficiently high black density to attain superior visibility can be obtained while still affording the advantage of total restriction to the desired amount of shot-in ink.

The above description has focused on a gradation from white to black. As the lightness decreases (the grayscale value becomes large), a larger amount of black ink is used also in chromatic colors. Therefore, the output of black in the high gray-level side of the output gamma correction table can be increased also for other colors.

Figure 6A:
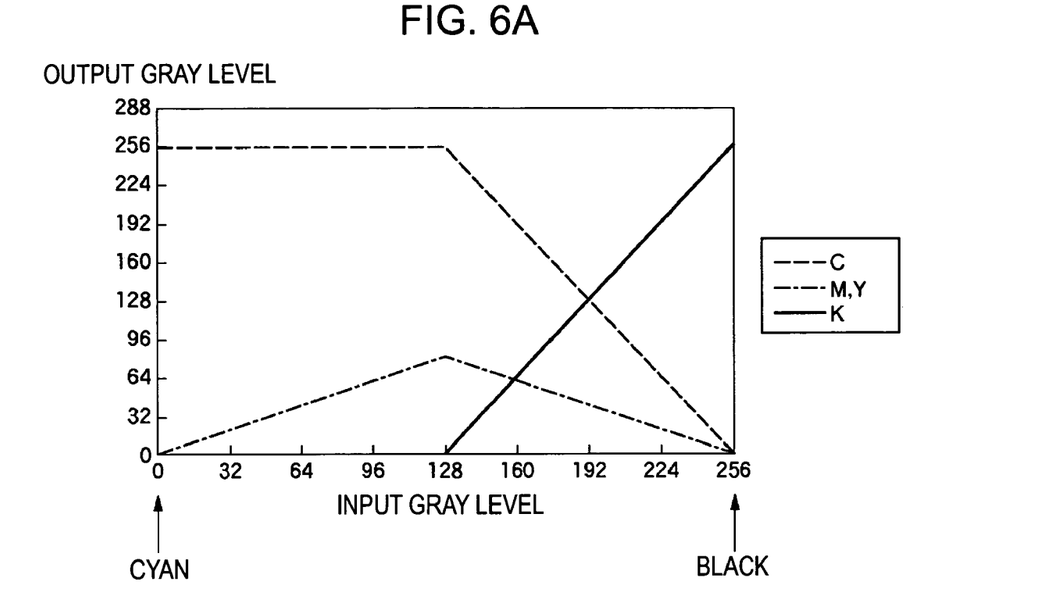
FIGS. 6A and 6B are graphs depicting ink assignment in a gradation from cyan to black before and after thinning, and the amount of shot-in ink in a gradation from cyan to black before and after thinning, according to the first embodiment.

A gradation from cyan to black will be described below as an example of chromatic colors. FIG. 6A is a graph depicting assignment of CMYK inks in a gradation from cyan to black, and corresponds to the three-dimensional LUT that gives parameters for processing carried out in the color-conversion processing section 201 shown in FIG. 2. The left end of the graph indicates "cyan", corresponding to an input signal of R=0 and G=B=255. The right end of the graph indicates "black", corresponding to an input signal of R=G=B=0. As is apparent from the figure, the gradation from cyan to black has a characteristic such that the amounts of magenta ink and yellow ink, which are complementary colors, gradually increase starting with the cyan ink only to decrease the color saturation down for darkness. When darkness enough to prevent black dots from being recognized is achieved, the use of the black ink is started and the amounts of CMY inks are decreased.

Figure 6B:
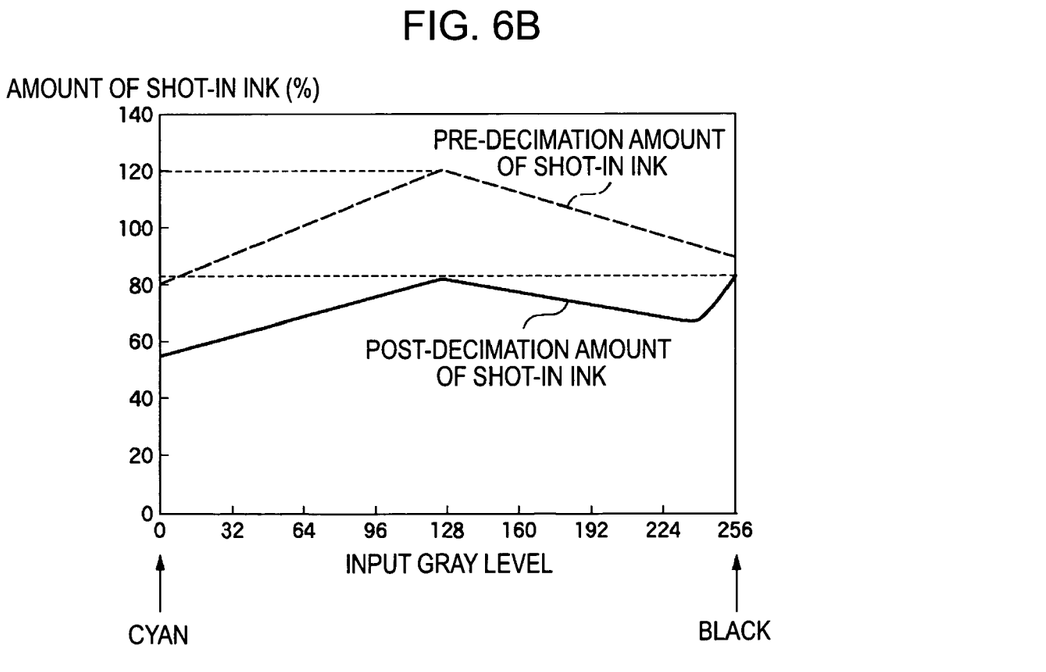

FIG. 6B is a graph depicting the amount of shot-in ink in a case where the characteristic of the output gamma correction table for CMYK is OPG1 and the amount of shot-in ink in a case where the characteristic of the output gamma correction table for CMY is OPG2 and the characteristic of the output gamma correction table for K is OPG3. The case where the characteristic of the output gamma correction table for CMYK is OPG1 represents normal mode (before thinning). The case where the characteristic of the output gamma correction table for CMY is OPG2 and the characteristic of the output gamma correction table for K is OPG3 represents thinning mode (after thinning).

As is apparent from this figure, while the maximum amount of shot-in ink is 120% in normal mode before thinning where OPG1 is used, the maximum amount of shot-in ink in thinning mode where OPG3 and OPG2 are used is suppressed to 85%. Even at this time, the maximum allowed black density is attained below the maximum amount of shot-in ink.

Modifications

In the above-described embodiment, the value of constant α set to generate OPG2 is the same for CMYK. Different values of constant α may be used for each ink color.

In the above-described embodiment, processing of output data to the ink-jet printer using inks of four colors CMYK has been described. For higher image quality, the present invention can also be applied to ink-jet printers using low-density inks or inks of special colors such as red and green. Also with a structure using such low-density inks and inks of special colors, the advantages of the present invention can be afforded by using the above-described configurations, namely, the characteristics of the output gamma correction table corresponding to black ink and characteristics of output gamma correction table corresponding to inks other than black. More specifically, thinning is carried out at a constant rate at all gray levels for inks other than black, whereas thinning is first carried out at a constant rate followed by increased output values only in high gray level areas for black. In this manner, the advantage of the present invention can be afforded.

In addition, an ink-jet method using water-based ink as color material has been described in the above-described embodiment. The present invention is also applied to a method using resin-based ink and an electrophotographic method.

Second Embodiment

A second embodiment according to the present invention will now be described. As in the first embodiment, the second embodiment also relates to image processing for generating output data for each ink to an ink-jet printer. Components and structures similar to those in the first embodiment will not be described. The following description focuses on portions specific to the second embodiment.

The first embodiment has described image processing in various modes, such as high-speed recording mode and draft recording mode, where the amount of shot-in ink for the same recording medium is restricted. The second embodiment to be described below discusses image processing for changing the amount of shot-in ink if recording media with the same color-forming property but with different amounts of absorbable ink are used.

The second embodiment is described by way of glossy paper 1 and glossy paper 2 having the same color-forming property, where the absorbable amount of ink of glossy paper 2 is smaller than that of glossy paper 1 due to the difference in thickness of the ink-absorbing layer. In this case, the three-dimensional LUT used to convert from RGB data to ink color data and the output gamma correction table OPG for glossy paper 1 are as follows. That is to say, the characteristic of the output gamma correction table for CMY inks is such that an arbitrary constant α (<1) is multiplied at all gray levels and an output gamma correction table where the amount of thinning is smaller in the high gray-level side than in the low gray-level side is generated as the output gamma correction table for K ink.

As described above, according to this embodiment, optimal color processing parameters can easily be produced for each of recording media with different amounts of shot-in ink.

Third Embodiment

The above-described first and second embodiments have described a method for controlling the amount of shot-in ink in the output gamma correction section in color processing. Alternatively, ink may be thinned in the recording apparatus main body.

Data that has been converted with color processing parameters and quantized for each color of the record color materials is loaded in the memory of the recording apparatus. A recording area is pre-divided into predetermined small segments, and the number of black dots in each small segment is counted. If the number of black dots in the small segment is larger than a predetermined value, the corresponding segment is determined as a dark area in the vicinity of black and a smaller number of black dots are thinned. In contrast, if the number of black dots is smaller than the predetermined value, the corresponding segment is determined as not an area in the vicinity of black, and a larger number of dots are thinned than in an area determined as in the vicinity of black.

A thinning mask may be provided in combination of a plurality of masks with different amounts of thinning or may employ a method for carrying out thinning depending on data, so-called a sequential multiscan method.

In this case, dot counting and other processing of chromatic inks other than black are not carried out. Instead, a mask with a predetermined thinning rate is applied for thinning processing.

Other Embodiments

The present invention may be applied to an image processing system or a recording system including a plurality of devices and to an image processing apparatus including a single device.

Furthermore, the present invention can also be achieved by supplying a system or an apparatus with a software program for achieving the functions according to the above-described embodiments and then causing a computer of the system or the apparatus to load the program code from to execute it. In addition, the system or the apparatus software may be supplied with program directly or remotely. To realize the present invention, any entity functioning as a program is acceptable.

Therefore, the program code itself installed in a computer to realize the functional processing of the present invention on the computer is also covered the present invention. In short, a computer program itself for realizing the functional processing of the present invention is included in a claim of the present invention.

In this case, any form of program, including a program executed as object code or by an interpreter and script data supplied to the OS, is acceptable, as long as it functions as a program.

The storage medium for supplying the program code includes a flexible disk, a hard disk, an optical disk, a magneto-optical disk, an MO, a CD-ROM, a CD-R, a CD-RW, a magnetic tape, a non-volatile memory card, a ROM, and a DVD (DVD-ROM and DVD-R).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-280027 filed Sep. 27, 2004, which is hereby incorporated by reference herein in its entirety.

What is claimed is:

1. An image processing apparatus for processing image data output to an ink-jet recording apparatus for performing color recording using inks of a plurality of colors, comprising:
   a thinning unit configured to apply the processing of thinning dots recorded with the inks of the plurality of colors to image data corresponding to each of the inks of the plurality of colors;
   a generation unit configured to generate recording data for performing recording with the inks of the plurality of colors based on the image data processed by the thinning unit;
   a color-conversion processing section configured to convert input data into data corresponding to each of the plurality of colors;
   a gamma correction section configured to apply gamma correction to the data corresponding to each of the plurality of colors; and
   a quantization processing section configured to convert the data subjected to gamma correction by the gamma correction section into quantized data, wherein the gamma correction section performs correction to decrease a grayscale value represented by data, and causes gamma correction for data corresponding to a chromatic ink from among the plurality of inks to differ from gamma correction for data corresponding to an achromatic ink from among the plurality of inks, and wherein the thinning unit causes thinning processing for image data corresponding to a chromatic ink from among the plurality of inks to differ from thinning processing for image data corresponding to an achromatic ink from among the plurality of inks.

2. The image processing apparatus according to claim 1, wherein the gamma correction section applies a lower degree of correction to the data corresponding to the achromatic ink at a higher gray level than at a lower gray level.

3. The image processing apparatus according to claim 1, wherein correction is applied to the data corresponding to the chromatic ink to decrease the data by a predetermined factor at all gray levels.

4. The image processing apparatus according to claim 3, wherein the gamma correction section applies processing to higher gray level data for the achromatic ink to decrease the grayscale value by a smaller factor than the predetermined factor.

5. The image processing apparatus according to claim 1, wherein the gamma correction section sets an amount of correction such that the maximum amount of shot-in ink in a predetermined area is equal to or smaller than a set value.

6. The image processing apparatus according to claim 1, wherein the chromatic color includes cyan, magenta, and yellow, and the achromatic color includes black.

7. The image processing apparatus according to claim 1, further comprising:
a control unit configured to control correction processing in the gamma correction section according to a recording mode supported by the ink-jet recording apparatus.

8. The image processing apparatus according to claim 1, further comprising:
a control unit configured to control correction processing in the gamma correction section according to a recording medium used in the ink-jet recording apparatus.

9. An image processing method for processing image data output to an ink-jet recording apparatus for performing color recording using inks of a plurality of colors, comprising steps of:
applying the processing of thinning dots recorded with the inks of the plurality of colors to image data corresponding to each of the inks of the plurality of colors;
generating recording data for performing recording with the inks of the plurality of colors based on the image data processed in the applying the processing;
converting input data into data corresponding to each of the plurality of colors;
applying gamma correction to the data corresponding to each of the plurality of colors; and
converting the data subjected to gamma correction by the gamma correction section into quantized data,
wherein, in the applying the processing, thinning processing for image data corresponding to a chromatic ink from among the plurality of inks differs from thinning processing for image data corresponding to an achromatic ink from among the plurality of inks, and
wherein the gamma correction section performs correction to decrease a grayscale value represented by data, and causes gamma correction for data corresponding to a chromatic ink from among the plurality of inks to differ from gamma correction for data corresponding to an achromatic ink from among the plurality of inks.

10. The image processing method according to claim 9, wherein applying gamma correction to the data corresponding to each of the plurality of colors comprises applying a lower degree of correction to the data corresponding to the achromatic ink at a higher gray level than at a lower gray level.

11. An image processing apparatus for processing image data output to an ink-jet recording apparatus for performing color recording using inks of a plurality of colors, comprising:
a color-conversion processing section configured to convert input data into data corresponding to each of the plurality of colors;
a gamma correction section configured to apply gamma correction to the data corresponding to each of the plurality of colors; and
a quantization processing section configured to convert the data subjected to gamma correction by the gamma correction section into quantized data,
wherein the gamma correction section performs correction to decrease a grayscale value represented by data, causes gamma correction for data corresponding to a chromatic ink from among the plurality of inks to differ from gamma correction for data corresponding to an achromatic ink from among the plurality of inks, and applies a smaller amount of correction to the data corresponding to the achromatic ink at a higher gray level than at a lower gray level.

12. An image processing method for processing image data output to an ink-jet recording apparatus for performing color recording using inks of a plurality of colors, comprising steps of:
converting input image data into data corresponding to each of the plurality of colors;
applying gamma correction to the data corresponding to each of the plurality of colors; and
converting the data subjected to gamma correction into quantized data for each ink,
wherein, in the applying gamma correction, correction for decreasing a grayscale value represented by data is performed,
gamma correction for data corresponding to a chromatic ink from among the plurality of inks differs from gamma correction for data corresponding to an achromatic ink from among the plurality of inks, and
a smaller amount of correction is applied to the data corresponding to the achromatic ink at a higher gray level than at a lower gray level.

13. A printer driver executed by a computer device that can be connected to an ink-jet recording apparatus for performing color recording using inks of a plurality of colors to output image data to the recording apparatus via an interface, the printer driver including program code executing steps of:
converting input image data into data corresponding to each of the plurality of colors;
applying gamma correction to the data corresponding to each of the plurality of colors; and
converting the data subjected to gamma correction into binary data for each ink,
wherein, in the applying gamma correction, correction for decreasing a grayscale value represented by data is performed,
gamma correction for data corresponding to a chromatic ink from among the plurality of inks differs from gamma correction for data corresponding to an achromatic ink from among the plurality of inks, and a smaller amount of correction is applied to the data corresponding to the achromatic ink at a higher gray level than at a lower gray level.

14. An ink-jet recording apparatus for performing color recording using inks of a plurality of colors based on data sent from an externally connected computer device, comprising:

a thinning unit configured to thin received data; and a recording unit configured to perform recording using the inks of the plurality of colors based on the data thinned by the thinning unit, wherein the thinning unit causes thinning processing for image data corresponding to a chromatic ink from among the plurality of inks to differ from thinning processing for image data corresponding to an achromatic ink from among the plurality of inks, and wherein the thinning unit thins data corresponding to a chromatic ink at a predetermined rate at all gray levels, and thins data corresponding to an achromatic ink at a lower rate at a higher gray level than at a lower gray level.

15. A recording control method in an ink-jet recording apparatus for performing color recording using inks of a plurality of colors based on data sent from an externally connected computer device, the recording control method comprising steps of:

receiving data from the computer device;

thinning the received data; and performing recording based on the data thinned in the thinning, wherein, in the thinning, thinning processing for image data corresponding to a chromatic ink from among the plurality of inks differs from thinning processing for image data corresponding to an achromatic ink from among the plurality of inks, and wherein the thinning unit thins data corresponding to a chromatic ink at a predetermined rate at all gray levels, and thins data corresponding to an achromatic ink at a lower rate at a higher gray level than at a lower gray level.

* * * * *